United States Patent
Bouguerra et al.

(10) Patent No.: US 12,513,100 B2
(45) Date of Patent: Dec. 30, 2025

(54) COMPUTERIZED SYSTEMS AND METHODS FOR AN ELECTRONIC INBOX DIGEST

(71) Applicant: YAHOO ASSETS LLC, New York, NY (US)

(72) Inventors: Bassem Bouguerra, Long Beach, CA (US); Kevin Patel, Fremont, CA (US); Shashank Khanna, Fremont, CA (US); Shiv Shankar Sahadevan, San Jose, CA (US)

(73) Assignee: YAHOO ASSETS LLC, New York, NY (US)

(*) Notice: Subject to any disclaimer, the term of this patent is extended or adjusted under 35 U.S.C. 154(b) by 169 days.

(21) Appl. No.: 18/476,365

(22) Filed: Sep. 28, 2023

(65) Prior Publication Data

US 2024/0354491 A1 Oct. 24, 2024

Related U.S. Application Data

(60) Provisional application No. 63/497,944, filed on Apr. 24, 2023.

(51) Int. Cl.
*G06F 17/00* (2019.01)
*G06F 16/34* (2019.01)
(Continued)

(52) U.S. Cl.
CPC .......... *H04L 51/214* (2022.05); *G06F 16/345* (2019.01); *G06F 40/166* (2020.01); *G06F 40/20* (2020.01); *G06F 40/205* (2020.01); *G06F 40/30* (2020.01); *G06F 40/40* (2020.01); *G06Q 10/1093* (2013.01); *H04L 51/02* (2013.01);
(Continued)

(58) Field of Classification Search
CPC ....... H04L 51/214; H04L 51/02; H04L 51/04; H04L 51/046; H04L 51/216; H04L 51/42; G06F 16/345; G06F 40/166; G06F 40/20; G06F 40/205; G06F 40/30; G06F 40/40; G06Q 10/1095; G06Q 10/1093; H04W 4/02

See application file for complete search history.

(56) References Cited

U.S. PATENT DOCUMENTS 7,035,903 B1 * 4/2006 Baldonado ............ H04L 67/535
709/206
9,137,193 B2 * 9/2015 Wu .......................... H04L 51/52
(Continued)

FOREIGN PATENT DOCUMENTS

WO    WO-2006023718 A2 *  3/2006  .......... G06F 16/9554
WO    WO-2019027259 A1 *  2/2019  .......... G06F 16/3326
(Continued)

*Primary Examiner* — Laurie A Ries
(74) *Attorney, Agent, or Firm* — James J. DeCarlo; Greenberg Traurig, LLP (57) ABSTRACT

Disclosed embodiments are directed toward a computer-implemented system and method for providing an email digest in association with an interface display of an electronic inbox. The disclosed digest includes non-native inbox functionality related to a summary data structure that includes an interactive portion, whereby upon generation of electronic prompts via a large language model (LLM), the digest can leverage functionality of the LLM to determine how electronic inbox content can be rendered for display.

20 Claims, 7 Drawing Sheets (51) Int. Cl.
  *G06F 40/166* (2020.01)
  *G06F 40/20* (2020.01)
  *G06F 40/205* (2020.01)
  *G06F 40/30* (2020.01)
  *G06F 40/40* (2020.01)
  *G06Q 10/1093* (2023.01)
  *H04L 51/02* (2022.01)
  *H04L 51/04* (2022.01)
  *H04L 51/046* (2022.01)
  *H04L 51/214* (2022.01)
  *H04L 51/216* (2022.01)
  *H04L 51/42* (2022.01)
  *H04W 4/02* (2018.01)

(52) U.S. Cl.
  CPC ............ *H04L 51/04* (2013.01); *H04L 51/046* (2013.01); *H04L 51/216* (2022.05); *H04L 51/42* (2022.05); *H04W 4/02* (2013.01)

(56) References Cited

U.S. PATENT DOCUMENTS

| | | | |
|---|---|---|---|
| 9,373,261 B2* | 6/2016 | Horstemeyer | H04L 63/08 |
| 10,348,667 B2* | 7/2019 | Sharp | H04L 51/212 |
| 10,628,632 B2* | 4/2020 | Di Paolo | G06F 40/169 |
| 11,887,359 B2* | 1/2024 | Zhou | G10L 15/187 |
| 11,989,237 B2* | 5/2024 | Wang | G06F 16/90332 |
| 12,107,812 B2* | 10/2024 | Kapinos | H04L 51/214 |
| 12,287,833 B1* | 4/2025 | Chia | G06F 16/906 |
| 2005/0138067 A1* | 6/2005 | Billsus | G06F 16/9535 707/E17.112 |
| 2014/0280643 A1* | 9/2014 | Banatwala | H04L 51/212 709/206 |
| 2015/0033141 A1* | 1/2015 | Mishra | H04L 51/42 715/752 |
| 2018/0212912 A1* | 7/2018 | Ramalingam | H04L 51/42 |
| 2019/0173825 A1* | 6/2019 | Ramalingam | H04L 51/10 |
| 2019/0379753 A1* | 12/2019 | Brunn | H04L 67/55 |
| 2021/0209121 A1* | 7/2021 | Liu | G06F 18/2411 |
| 2022/0019619 A1* | 1/2022 | Raviv | H04L 51/42 |
| 2022/0321521 A1* | 10/2022 | Shrivastava | G06F 3/0482 |
| 2022/0417192 A1* | 12/2022 | Dotan-Cohen | G06F 40/30 |
| 2024/0273291 A1* | 8/2024 | Smith | G06F 16/383 |

FOREIGN PATENT DOCUMENTS

| | | | | |
|---|---|---|---|---|
| WO | WO-2021255057 A1 * | 12/2021 | ............ | G06F 40/289 |
| WO | WO-2022250909 A1 * | 12/2022 | ............ | G06F 40/166 |

* cited by examiner

COMPUTERIZED SYSTEMS AND METHODS FOR AN ELECTRONIC INBOX DIGEST

CROSS-REFERENCE TO RELATED APPLICATIONS

This application claims the benefit of Provisional Patent Application No. 63/497,944, filed on Apr. 24, 2023, which is hereby incorporated by reference in its entirety.

BACKGROUND

Information in an electronic message (email) can be composed in unique prose and formats. The prose can be organized in a unique style, and the contents of the email can be uniquely formatted. This non-uniformity can make it difficult for users to glean information and take necessary actions based on such information.

SUMMARY

Conventional inbox messaging systems are limited in functionality that enables a user to quickly and efficiently understand and act on received messages. To that end, according to some embodiments, the present disclosure addresses such shortcomings, among other features, and provides novel computerized systems and methods for providing a user with an electronic email digest. According to some embodiments, as discussed herein, the email digest can include, but is not limited to, a summary data structure that includes interactive functionality enabling a user to interact with a large language model (LLM), such that the digest can leverage the computational analysis and output from LLM to refine how the user can engage with content from within their inbox.

DETAILED DESCRIPTION

In some embodiments, the instant disclosure describes techniques for providing and implementing an inbox digest (or email digest, used interchangeably) summary application. In some embodiments, the disclosed email digest summary application can determine an inbox digest summary preference of a user, and based therefrom, execute a machine learning algorithm and/or LLM to determine user intent, activities and/or interactions with content from the user's inbox via automatically recommended LLM prompts.

It should be understood that while the discussion herein will focus on an email within an inbox of a user, it should not be construed as limiting, as other types of known or to be known electronic messages (e.g., SMS, MMS, social messages/posts, shared multi-media, and the like) can form the basis for the executed functionality discussed herein without departing from the scope of the disclosed systems and methods.

Figure 1:
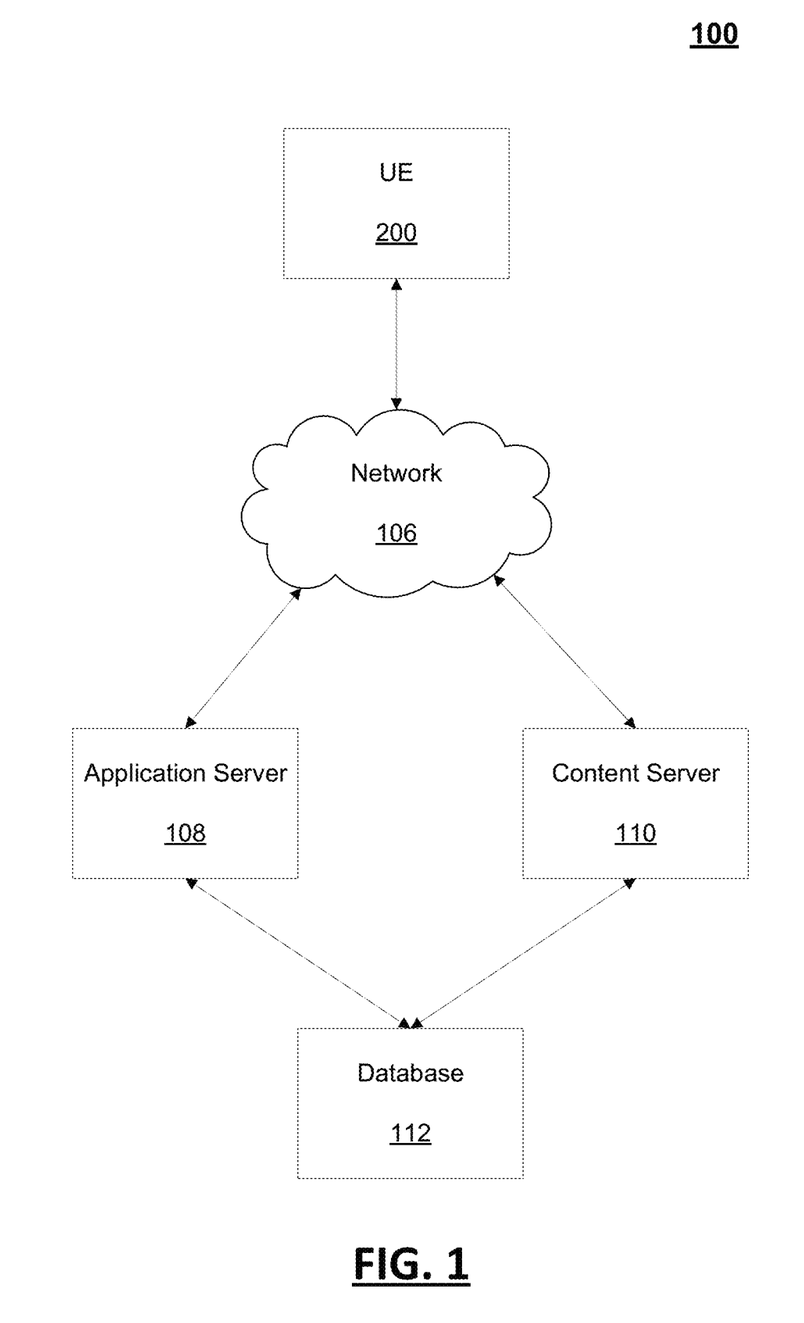
FIG. 1 is a block diagram illustrating an example of a network within which the system and method disclosed herein can be implemented according to some embodiments of the present disclosure.

FIG. 1 is a block diagram illustrating an example of a network within which the system and method disclosed herein can be implemented according to some embodiments of the present disclosure.

As depicted in FIG. 1, the network 106 can communicatively couple user equipment (UE) 200 to an application server 108, and a content server 110 to a database 112. According to some embodiments, UE 200 can be any type of device that is capable of displaying an inbox, accessing a messaging account, such as for example a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. In some embodiments, the disclosed email digest summary application can be implemented on a digest engine 300 (see FIG. 3) of this disclosure. In some embodiments, the digest engine 300 can operate on an application server 108 communicatively coupled to an email application server. In some embodiments, the disclosed digest engine 300 can operate on a content server 110 communicatively coupled to the application server and the database 112. In some embodiments, the disclosed digest engine 300 can operate in a virtual computing system in the network 106. In some embodiments, the digest engine 300 can operate on a user device, such as, for example UE 200 (see, FIG. 2, discussed infra). In some embodiments, as discussed herein, the digest engine 300 can be configured to operate on any similar computing device or similar endpoint, or any combination thereof.

Figure 2:
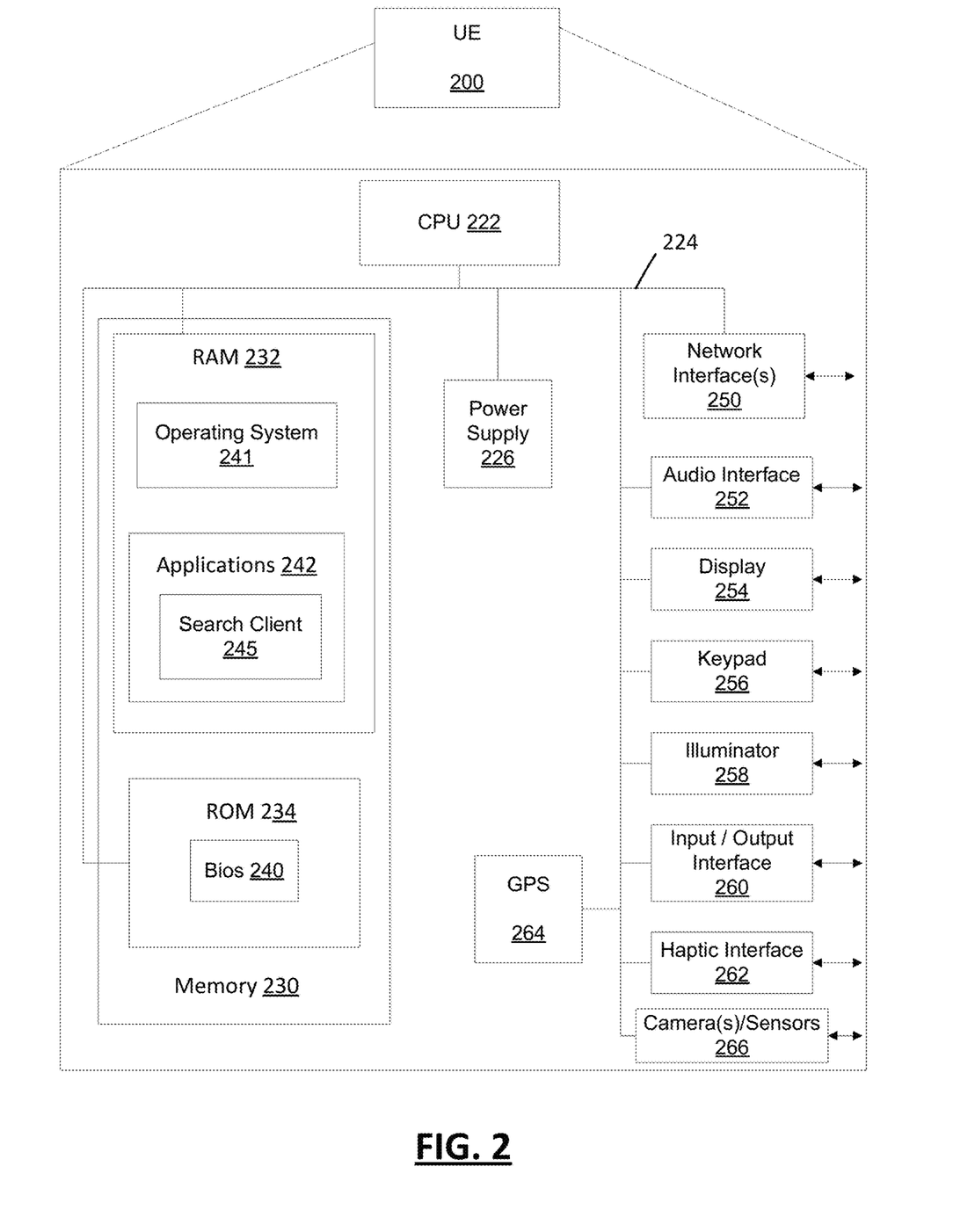
FIG. 2 is a block diagram illustrating an example of a user equipment device on which the digest engine 300 can operate in accordance with some embodiments of the present disclosure.

FIG. 2 is a block diagram illustrating an example of computing device (e.g., UE) on which the digest engine 300 can operate in accordance with some embodiments of the present disclosure.

As shown in FIG. 2, the UE 200 includes a central processing unit (CPU) 222 in communication with a mass memory 230, ROM 234, power supply 226 via a bus 224. The UE 200 also includes one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal, or electromagnetic sensors 266. UE 200 can include one camera/sensor 266 or a plurality of cameras/sensors 266. The positioning of the camera(s)/sensor(s) 266 on the UE 200 can change per UE 200 model, per UE 200 capabilities, and the like, or some combination thereof.

In some embodiments, the CPU 222 can comprise a general-purpose CPU. The CPU 222 can comprise a single-core or multiple-core CPU. The CPU 222 can comprise a system-on-a-chip (SoC) or a similar embedded system. In some embodiments, a GPU can be used in place of, or in combination with, a CPU 222. Mass memory 230 can comprise a dynamic random-access memory (DRAM) device, a static random-access memory device (SRAM), or a Flash (e.g., NAND Flash) memory device. In some embodiments, mass memory 230 can comprise a combination of such memory types. In one embodiment, the bus 224 can comprise a Peripheral Component Interconnect Express (PCIe) bus. In some embodiments, the bus 224 can comprise multiple busses instead of a single bus.

Mass memory 230 illustrates another example of computer storage media for the storage of information such as computer-readable instructions, data structures, program modules, or other data. Mass memory 230 stores a basic input/output system ("BIOS") 240 for controlling the low-level operation of the UE 200. The mass memory also stores an operating system 241 for controlling the operation of the UE 200.

Applications 242 can include computer-executable instructions which, when executed by the UE 200, perform any of the methods (or portions of the methods) described previously in the description of the preceding figures. In some embodiments, the software or programs implementing the method embodiments can be read from a hard disk drive (not illustrated) and temporarily stored in RAM 232 by CPU 222. CPU 222 can then read the software or data from RAM 232, process them, and store them to RAM 232 again. In some embodiments, applications 242 can include a search client 245.

The UE 200 can optionally communicate with a base station (not shown) or directly with another UE. Network interface 250 is sometimes known as a transceiver, transceiving device, or network interface card (NIC).

The audio interface 252 produces and receives audio signals such as the sound of a human voice. For example, the audio interface 252 can be coupled to a speaker and microphone (not shown) to enable telecommunication with others or generate an audio acknowledgment for some action. Display 254 can be a liquid crystal display (LCD), gas plasma, light-emitting diode (LED), or any other type of display used with a UE. Display 254 can also include a touch-sensitive screen arranged to receive input from an object such as a stylus or a digit from a human hand.

Keypad 256 can comprise any input device arranged to receive input from a user. Illuminator 258 can provide a status indication or provide light.

The UE 200 also comprises an input/output interface 260 for communicating with external devices, using communication technologies, such as USB, infrared, Bluetooth™, or the like. The haptic interface 262 provides tactile feedback to a user of the client device.

The optional GPS transceiver 264 can determine the physical coordinates of the UE 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS, or the like, to further determine the physical location of the UE 200 on the surface of the Earth. In one embodiment, however, the UE 200 can communicate through other components, provide other information that can be employed to determine a physical location of the device, including, for example, a MAC address, IP address, or the like.

The device can include more or fewer components than those shown in FIG. 2, depending on the deployment or usage of the device. For example, a server computing device, such as a rack-mounted server, can include audio interfaces, displays, keypads, illuminators, haptic interfaces, Global Positioning System (GPS) receivers, or cameras/sensors. Some devices can include additional components not shown, such as graphics processing unit (GPU) devices, cryptographic co-processors, (AI) accelerators, or other peripheral devices.

Figure 3:
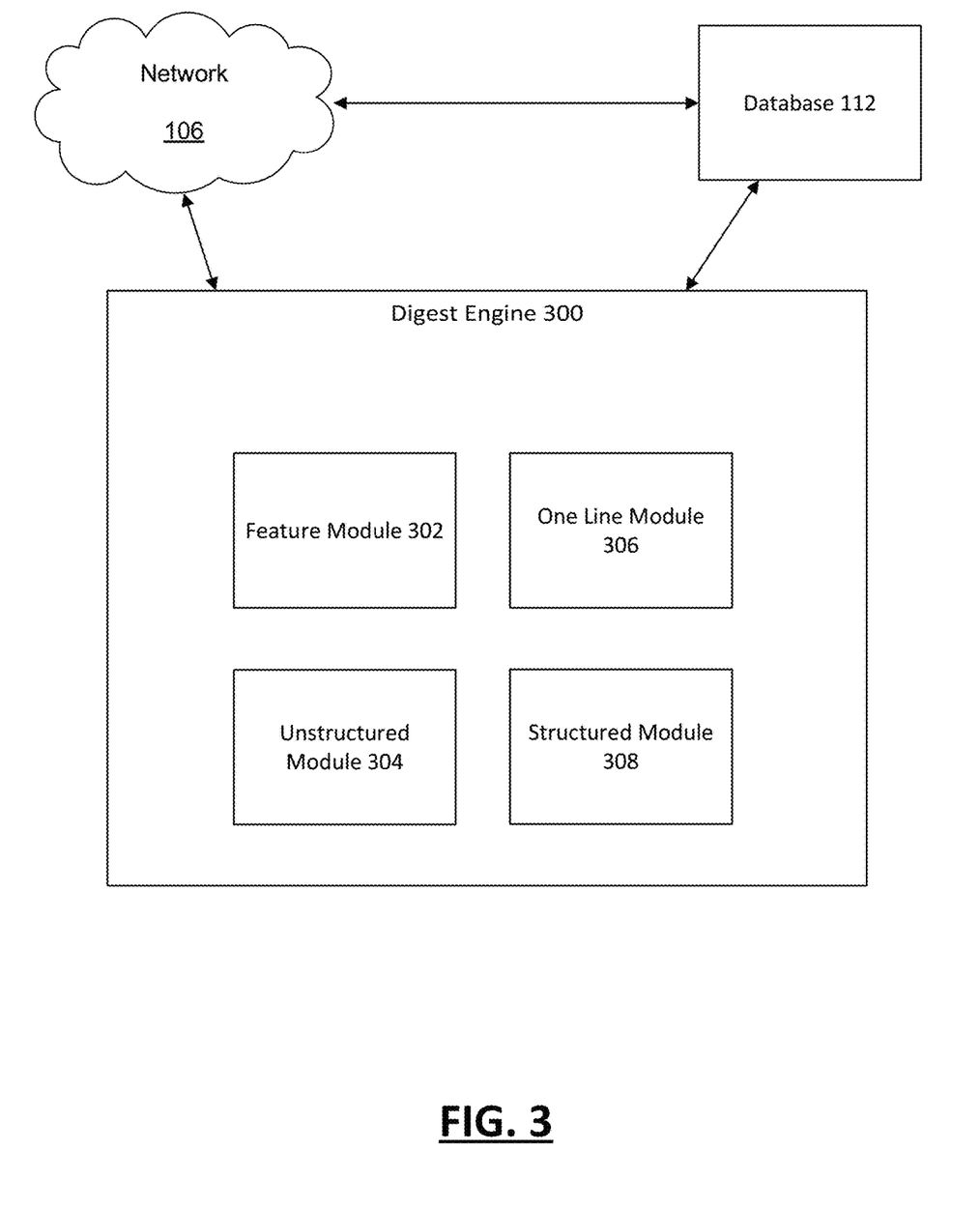
FIG. 3 is a block diagram illustrating components of an exemplary system in accordance with some embodiments of the present disclosure.

FIG. 3 is a block diagram illustrating components of an exemplary system in accordance with some embodiments of the present disclosure. The illustrative digest engine 300 can be configured to identify data items of an electronic message associated with an email inbox of a user. In some embodiments, the digest engine 300 can be configured with one or more artificial intelligence (AI) algorithm(s) and/or machine learning (ML) model(s) and/or large language models (LLM). In some embodiments, the AI/ML model(s) can be configured as transformer large language (TLL) model(s). Each LLM can be trained on large amounts of text data from various sources, learning the statistical relationship between words, phrases, and sentences. Once trained the LLM is capable of generating a prompt to display to a user in the form of an output text, (e.g., automated output) as discussed herein.

According to some embodiments, the LLM can be configured to first tokenize text input into a sequence of words, where the tokens can then be encoded as vector representations of the tokens such as for example by the feature module 302. The LLM can be configured to utilize an encoder to transform the embeddings of all the tokens into a context vector. The LLM can be further configured to utilize a decoder to decode the context vector and generate output (the subsequent word(s) that statistically are most likely to follow the input). In some embodiments, the digest engine 300 is not limited to utilizing a transformer large language model but can utilize any type of machine learning model(s) such as a zero-shot, domain-specific, fine-tuned, language representation, bidirectional encoder representations from transformers, multimodal, vector representation or any combination thereof.

In some embodiments, the digest engine 300 (which can embody the email digest application) can be configured to operate on the application server 108 or content server 110 or part of a virtual computing system on the network 106 communicatively coupled to database 112 and can be configured with one or more module(s) for determining an email digest summary and an LLM for refining how a user interacts with content in an inbox as discussed above. In some embodiments, the digest engine 300 can be configured with one or more module(s) each module can be configured as a computing device having one or more processors, a RAM/ROM, a memory system, a communication bus, a communication interface, specific hardware computing components that can be included in each module have been described in detail in FIG. 2. In some embodiments, the module(s) can be communicatively coupled to a messaging service, each module can include, among other applications, a messaging application.

In some embodiments, the digest engine 300 can be configured with a feature module 302 for determining vector representations. The feature module 302 can be configured to determine numerical representations of the data items associated with the email inbox of a user. The vector representations of the data items can be utilized by one or more AI and/or machine learning ML model(s) to determine sentiment embeddings for determining how a user interacts with content of the inbox as described in more detail herein.

In some embodiments, the digest engine 300 can be configured with an unstructured module 304 for determining an unstructured digest summary of an email message. In some embodiments, the unstructured module 304 can be configured with one or more AI and/or ML model(s) to determine sentiment embeddings and determine a prompt to display to the user. In some embodiments, the unstructured module 304 can also be configured with one or more applications for determining a summary data structure for an unstructured summary as described below.

In some embodiments, the digest engine 300 can be configured with a one line module 306 for determining a one line digest summary of an email message. In some embodiments, the one line module 306 can be configured with one or more AI and/or ML model(s) to determine sentiment embeddings and determine a prompt to display to a user. In some embodiments, the one line module 306 can also be configured with one or more applications for determining a summary data structure for a one line summary as described below.

In some embodiments, the digest engine 300 can be configured with a structured module 308 for determining a structured summary of an email message. In some embodiments, the structured module 308 can be configured with one or more AI and/or ML model(s) to determine sentiment embeddings and determine a prompt to display to a user. In some embodiments, the structured module 308 can also be configured with one or more applications for determining a summary data structure for a structured summary as described below.

Figure 5A:
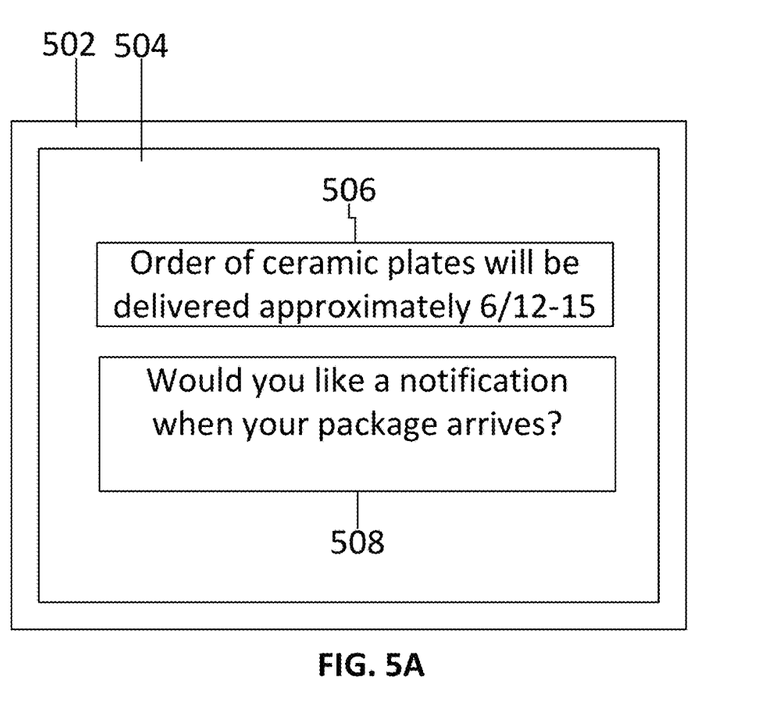
FIG. 5A and FIG. 5B illustrate non-limiting examples of a user interface display of a one line summary according to some of the example embodiments.
Figure 6:
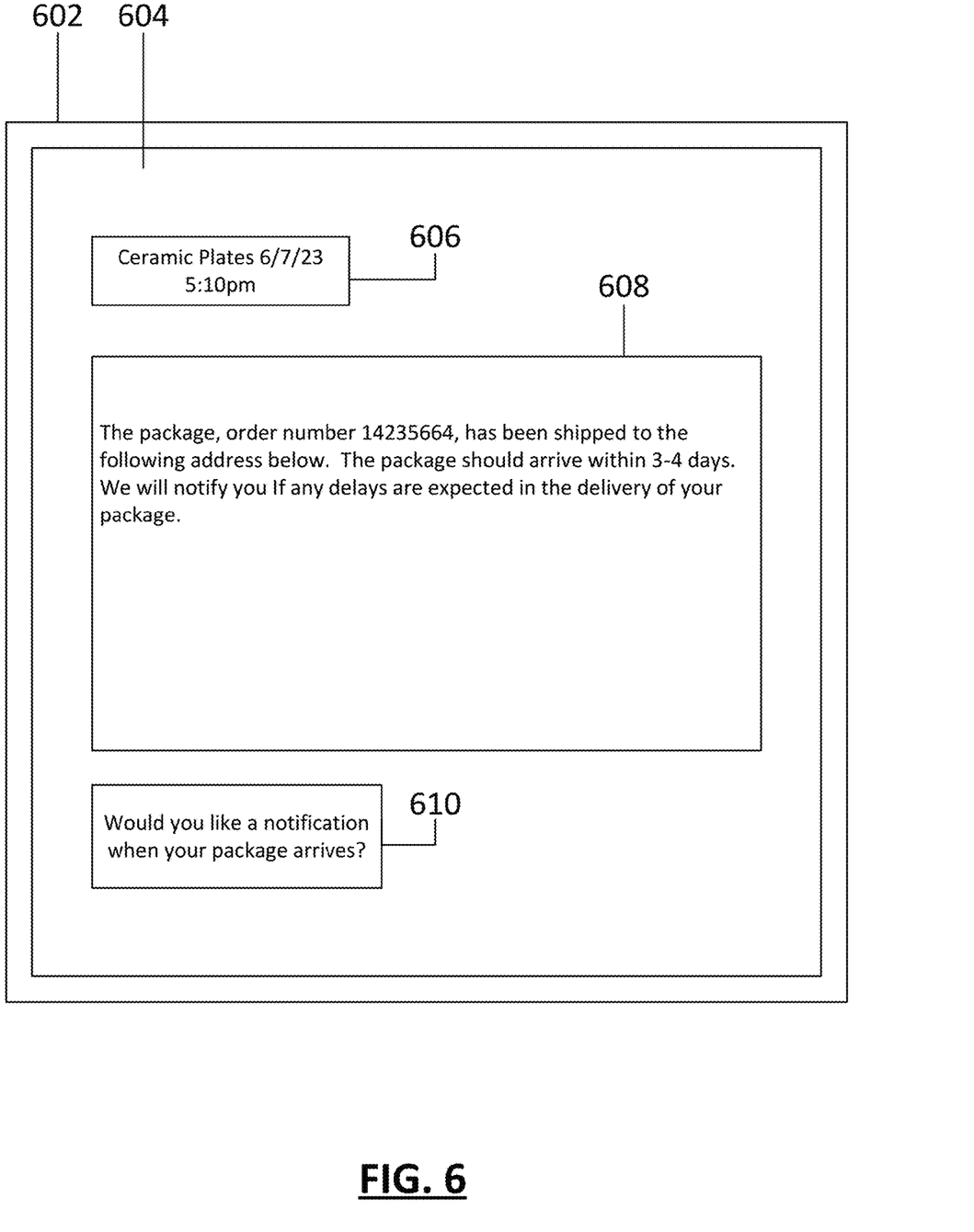
FIG. 6 is a non-limiting example user interface display of an unstructured summary according to some of the example embodiments.
Figure 7:
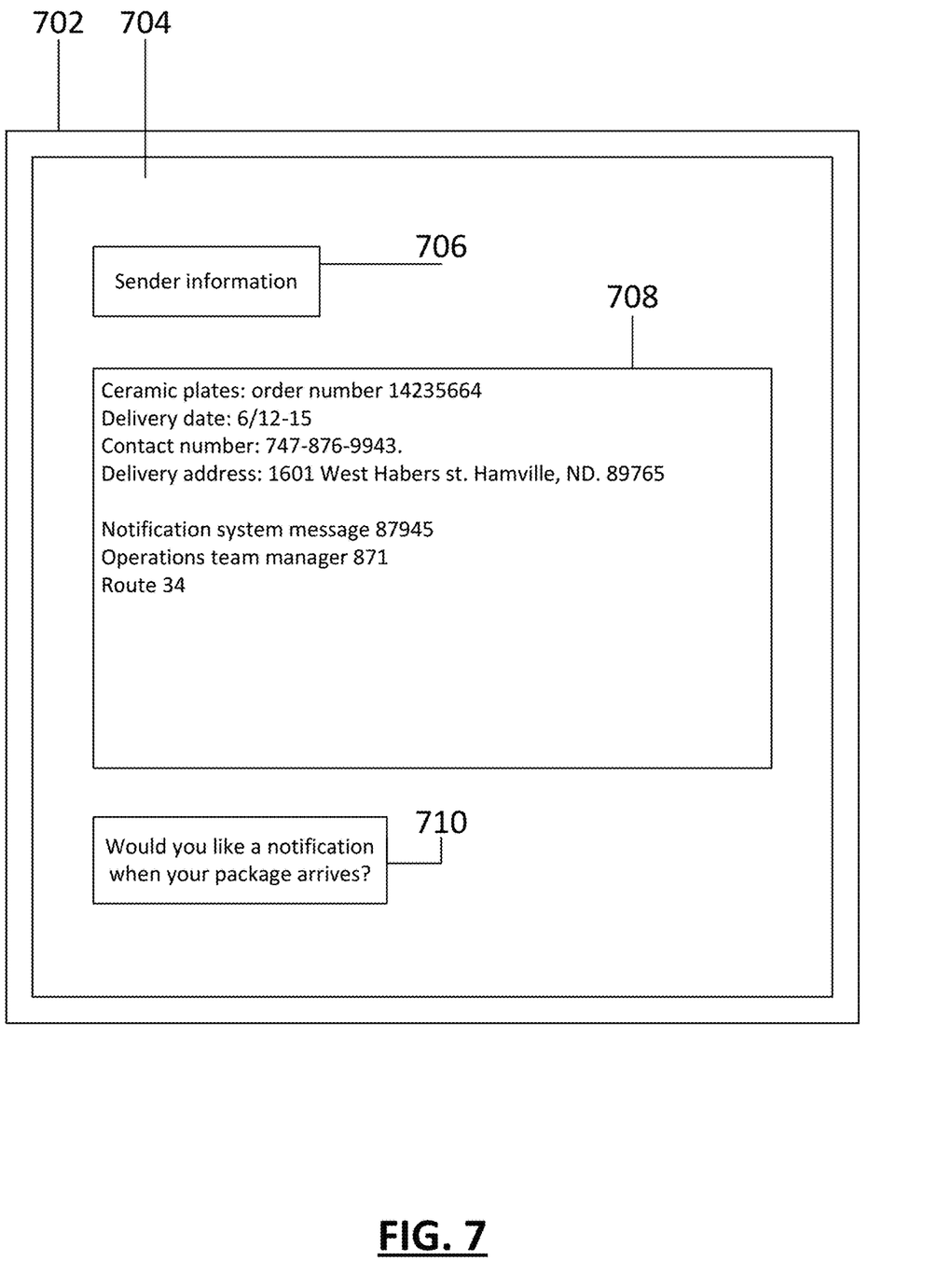
FIG. 7 is a non-limiting example user interface display of a structured summary according to some of the example embodiments.

In some embodiments, each of the one or more AI and/or ML model(s) LLM model of the unstructured module 304, the one line module 306, and the structured module 308 can be independently trained models. In some embodiments, the one line module 306 can be configured to utilize a LLM to determine a summary of a received message. In some embodiments, the LLM of the one line module 306 can be independently trained to generate a one sentence summary, (e.g., one line summary) of messages received in the inbox of the user depending on a user preference, an example of which is illustrated in FIG. 5. In some embodiments, the unstructured module 304 can be configured to utilize an independently trained LLM to determine a summary of a received message. In some embodiments, the LLM of the unstructured module 304 can be independently trained to generate an unstructured summary of messages received in the inbox of the user depending on a user preference. In some embodiments, the LLM of the unstructured module 304 can be trained to determine user relevant information in a message in a complete sentence format, and example of which is illustrated in FIG. 6. In some embodiments, user relevant information can be context time-sensitive based information that requires a user response, for example an upcoming package delivery or an appointment and disregard all other information in the message. In some embodiments, the structured module 308 can be configured with an independently trained LLM, trained to generate a structured summary message of a received message, depending on a user preference. In some embodiments, the structured summary message LLM can be trained to determine in simple bullet point, information from a received message, an example of which is illustrated in FIG. 7.

In some embodiments, the digest engine 300 user interface can be configured with an LLM prompt for displaying a determined prompt and receiving user interactions such as for example on a user device UE 200. In some embodiments, the digest engine 300 can be configured to transmit the LLM prompt over a network to a centralized LLM via an application programming interface (API) or similar endpoint. In some embodiments, the LLM can be executing locally on the device executing the messaging client.

Figure 4:
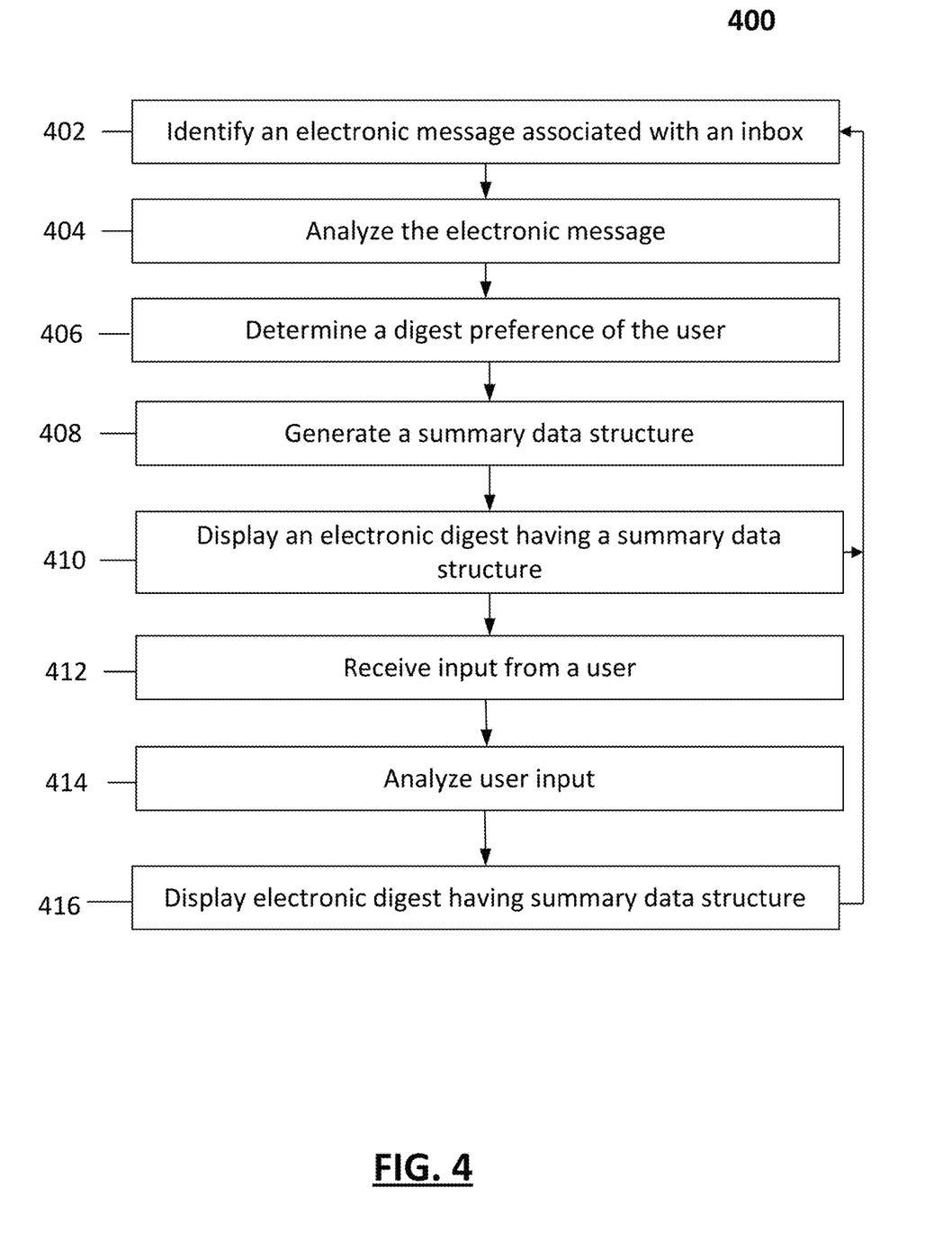
FIG. 4 is a flow diagram illustrating a non-limiting example embodiment in accordance with some embodiments of the present disclosure.

FIG. 4 is a flow diagram illustrating Process 400 for generating and providing an inbox digest in accordance with some embodiments of the present disclosure.

In some embodiments, at Step 402, the digest engine 300 can identify an electronic message associated with an inbox of a user. In some embodiments, the digest engine 300 can monitor an inbox of a user to identify the electronic message. In some embodiments, the digest engine 300 can identify an electronic message associated with other applications, as will be described in detail in the proceeding paragraphs of the disclosure. In some embodiments, the identifying can be directed to detecting data items, email messages, content, content types and/or other forms of digital media and/or information that can be newly received within an inbox and/or pre-existing within the inbox for a threshold period of time (e.g., within an inbox for 3 days without a response or interaction by the user, within the inbox and the content in the email indicates an upcoming deadline is approaching, and the like.

In some embodiments, Step 402 can further include identifying and/or monitoring activity associated with other applications (e.g., those operating on, executing by and/or accessed by UE 200)—for example, a notification application, an SMS application, a calendar application, a voicemail application, social media application, and/or any similar application that can receive or generate data items related to a user, message or data items within such messages, and/or any combination thereof.

In some embodiments, at Step 404, the digest engine 300 can identify information in the electronic message via a computational analysis performed on the message, inclusive of its data and/or metadata. In some embodiments, vector representations of the identified data items can be determined by a feature module 302 of the digest engine 300. In some embodiments, the vector representations can be a numerical representation of the data items identified in Step 402. The vector representations can be an n-dimensional vector of numerical features of the data items identified in Step 402, and/or can be a transformed and/or non-transformed numerical data items, a numeric representation of a data item such as for example punctuation, an emoji, and the like. In some embodiments, the vector representations of the data items can be utilized by one of the unstructured module 302, the one line module 304, and the structured module 306 of the digest engine 300 to determine embeddings to display to the user in the interactive portion of the user interface.

In some embodiments, at Step 406, the digest engine 300 can determine a digest preference of a user based on an analysis of user preferences. For example, as discussed herein, if the message content includes type A content, a user preference for how this content is to be displayed via an inbox digest can be retrieved based on such indicator.

In some embodiments, the digest engine 300 can store information related to user preferences in, for example, a storage device of application server 108, a UE 200 or any similar computing device. The digest preference of a user can determine which type of email digest the user will receive, for example, a one line summary, (see FIG. 5A and FIG. 5B), an unstructured summary (see FIG. 6) or a structured summary (see FIG. 7).

In some embodiments, in the absence of user preferences, the digest engine 300 can be configured to prepare all three email digest types and present them to the user to determine a user preference. In some embodiments, digest engine 300 can determine a user preference based on at least one of a category of user preference(s) such as click rate, user interaction(s) such as scrolling, viewing, or other similar interactions with the application or any combination thereof.

In some embodiments, at Step 406, the digest engine 300 can automatically (e.g., without user input defining a preference) determine a digest preference of a user based on an analysis of the electronic message. In some embodiments, where a digest preference has been established for a user, the digest engine 300 can update a user preference based on messages received by the user and the interactions with the message by the user. For example, a user can receive an appointment message from a dentist about an upcoming appointment. In the case where the user responds to a notification about the appointment, the user preference is updated to reflect that those messages received about dental appointments can appear as a notification to the user. In the case where the user does not respond to a notification about a dental appointment a user preference can be updated to reflect that a notification is not generated.

In some embodiments, at Step 406 the digest engine 300 can determine whether a message is to be summarized based on an importance level threshold of at least one category of interactions of a user preference for each message received by a user. For example, and as described above, a category of user interactions can include click/tap rates, scrolling, inputting text, a specific time of day at which a message is received, time-sensitive content and/or a time-sensitive message, a date on which the message is received, or similar context dependent data items that can be used to determine a user preference. A threshold can for example be based on a percentage of times a user clicks/taps on a single notification or single message and/or it can be based on a percentage of physical interactions with the notification or message. A threshold of the percentage can be set at, by way of non-limiting example 70%, 75%, 80%, 85%, 90%, 95%, 100%. In some embodiments, a threshold of the percentage can be set in a range of 70 (or lower) to 100%. In some embodiments, and as an example, in the case where a threshold for a user tapping on a notification from a specific sender is set at 80%, and the user subsequently exceeds this threshold by tapping on at least 80% of the notifications received from that sender, a user preference can be updated to reflect the user preference of receiving a notification in response to that specific sender.

In some embodiments, at Step 408 the digest engine 300 can generate a summary data structure. As discussed herein, the summary data structure can be an electronic data structure, file, content or media item, and/or any other type of interactive and/or executable file that can represent the summarization of a message according to a digest preference.

In some embodiments, generating a summary data structure can based on the determination of how a message is to be summarized, for example as a one line summary, an unstructured summary, or a structured summary (see FIGS. 5A, 5B, 6 and 7) of the message. Although text is primarily described as an input to the digest engine 300, the instant disclosure can utilize other types of content such as audio or video content. In some embodiments, the vector representations generated at Step 404 by the feature module 302 can be fed to one of the machine learning models and/or LLM(s) such as the unstructured module 304, the one line module 306, or the structured module 308 to determine a message and a prompt to be displayed to a user.

In some embodiments, at Step 408 the digest engine 300 can generate a summary data structure having the email digest summary e.g., one line summary an unstructured summary, or a structured summary (see FIGS. 5A, 5B, 6 and 7) to send to the user. The summary data structure includes the message formatted in at least one of a one line summary, an unstructured summary, a structured summary, and a prompt for user interaction with the LLM.

In some embodiments, at Step 410 the digest engine 300 can display an electronic digest having a summary data structure to a user. In some embodiments, the digest engine 300 can recursively proceed back to Step 402 so as to identify another electronic message, which can be performed in a similar manner as discussed above. Non-limiting depictions of the electronic digest having a summary data structure are provided in FIGS. 5A, 5B, 6 and 7, as discussed infra.

According to some embodiments, at Step 412 the digest engine 300 can receive an input from a user. In some embodiments, a user interface can be configured with functionality of an interaction portion, the interaction portion capable of receiving user input such as for example text, (see FIG. 5) an image, video, or any combination thereof. In some embodiments, an unstructured summary can be an electronic message about an upcoming conflict concerning a dental appointment. In some embodiments, the input from the user can be for example "yes, reschedule my dental appointment", where the user input is utilized by one of a machine learning models and/or LLM to determine a new dental appointment schedule based on data items in a calendar application and data items associated with an email inbox of a user and/or data items from other applications.

In some embodiments, an LLM can be executed by engine 200 to determine information related to the message and/or summary data structure, from which a prompt can be automatically generated via the LLM and presented to a user. Accordingly, the user can select a predetermined response, as generated by the LLM, or provide input responsive to the prompt.

According to some embodiments, at Step 414 the digest engine 300 can analyze a user input into an interaction portion of a summary data structure. In some embodiments, at Step 412 a user input into an interaction portion can be for example "yes, reschedule my dental appointment". In some embodiments, at Step 414 the digest engine 300 can include analyzing the user input by a machine learning model(s) and/or LLM to determine an intent of a user based on the received user input in Step 412 and/or determined behavior analysis from analysis of the users' activities. In some embodiments, the received user input can be output directly to one of a machine learning models and/or LLM, or may be combined with a set of stored embeddings either at a leading edge or trailing edge to determine an intent of the user.

In some embodiments, at Step 416 the digest engine 300 can access data items in additional applications, such as for example a calendar application, an SMS application, an MMS application a notification application, a voicemail application, social media application, and/or any similar application. In some embodiments, at Step 416 the digest engine 300 can access a calendar application and generate an event for example "dental appointment rescheduled for 6/15 at 1 pm". In some embodiments, the digest engine 300 can return to Step 402 to continue identifying an electronic message associated with an inbox after Step 416 of displaying the electronic digest having a summary data structure.

Figure 5B:
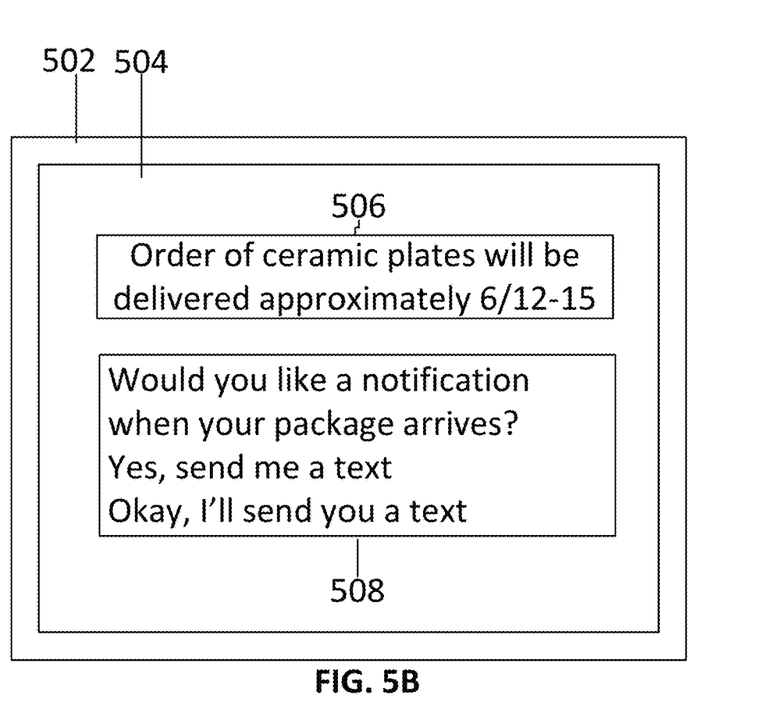

FIG. 5A and FIG. 5B provide non-limiting examples of screen diagrams illustrating a computing system user interface display of a one line summary according to some of the example embodiments. In some embodiments, as illustrated in FIG. 5A the summary data structure generated at Step 418 for a one line summary by the one line module 306 is output to a user device such as UE 200 the one line summary corresponding to a predefined manner for display to a user. The one line summary window 504 can be configured to be displayed on a screen 502 of a user device such as for example UE 200. In some embodiments, the window 504 can have additional windows such as a one line window 506, and a one line prompt window 508 for the automated prompt, the one line window 506 having the one line summary of the message received from a sender.

In some embodiments, the one line window 506 can be configured in a top portion of the window 504 of a user device such as UE 200. In some embodiments, the one line prompt window can be configured in a lower portion of the window 504.

In some embodiments, the one line window 506 can include a one line summary of the message received from a sender. An example of a one line summary can be "order of ceramic plates will be delivered 6/12-15".

In some embodiments, the one line module 306 of the digest engine 300 can receive a vector representation of a message from a sender. An example of an original message (from Step 402) is provided:

Dear Customer,
The package, order number 14235664, has been shipped to the following address below. The package should arrive within 3-4 days. We will notify you if any delays are expected in the delivery of your package. If you have any questions, please contact us at 747-876-9943.
Delivery address: 1601 West Habers st. Hamville, ND. 89765
Notification system message 87945
Operations team manager 871
Route 34

In some embodiments, the digest engine 300 utilizes the feature module 302 to determine a vector representation of the message described above. Utilizing the vector representations, the one line module 306 determines, by LLM, a user intent from the message and displays a prompt (e.g., goal of a user) in the one line prompt window 508 of FIG. 5A (e.g., Would you like a notification when your package arrives?).

In some embodiments, as illustrated in FIG. 5B corresponding to a predefined manner for display to a user, the one line prompt window 508 is configured to receive text, voice, image, and/or video input from a user. For example, a user can input the following text into the one line prompt window 508 "Yes, send me a text". In some embodiments, the digest engine 300 can be configured to determine vector representations of the text input "Yes, send me a text" and feed the vector representations to the one line module 306, the one line module 306 can determine from the sentiment embeddings of the vector representations a user intent. In some embodiments, the LLM prompt can generate text in response to the user input of the one line prompt window 508 "okay, I'll send you a text" based on the information received in the message from the user.

FIG. 6 depicts a non-limiting screen diagram illustrating a computing system user interface display of an unstructured summary according to some of the example embodiments. In some embodiments, the summary data structure generated at Step 418 for an unstructured summary by the unstructured module 304 is output to a user device such as UE 200 corresponding to a predefined manner for display to a user. The unstructured summary window 604 can be configured to be displayed on a screen 602 of a user device such as for example UE 200. In some embodiments, the window 604 can have additional windows such as a sender window 606, a message window 608 having the unstructured summary of the message, and an unstructured prompt window 610 for the automated prompt. In some embodiments, each of the unstructured summary, one line summary and structured summary user interface displays can appear as a tab in a scrollable display area of an inbox of a user's email application.

In some embodiments, the sender window 606 can be located at the top of the window 604 and can be configured to display information such as envelope information of the message e.g., sender, receipt time and date. In some embodiments, the message window 608 can include an unstructured summary of a message such as for example information about an order number, the expected date of delivery, contact phone number for problems or issues with the order, a delivery address, and information about the sender or vendor. In some embodiments, the unstructured module 304 determines, utilizing an LLM, an intent of a user from a message. The message received by the unstructured module 304 can be for example "your package will arrive on 5/25". The LLM can determine a user intent from the user input message and display to the user (e.g., Would you like a notification when your package arrives?), and display the message in the unstructured prompt window 610. In some embodiments, the unstructured module 304 displays the original message generated by the sender in the message window 608 to the user and determines a user intent prompt from the message and displays the prompt to the user in the unstructured prompt window 610. In some embodiments, the unstructured prompt window 610 can be configured to receive text input from a user for example, a user can input the text "send a text when it arrives" for further processing by the LLM. In some embodiments, the digest engine 300 of the digest engine 300 can first determine vector representations utilizing the feature module 302 of the input text "send a text when it arrives" and then feed the vector representations of input text to the unstructured module 304 to determine a user intent and message to display to a user in the unstructured prompt window 610. In response to the input text the LLM can, for example be configured to initiate a notification to be sent to the user when the package arrives.

FIG. 7 depicts a non-limiting screen diagram illustrating a computing system user interface display of a structured summary according to some of the example embodiments. In some embodiments, the summary data structure generated at Step 418 for a structured summary by the structured module 308 is output to a user device such as UE 200 corresponding to a predefined manner for display to a user. The structured summary window 704 can be configured to be displayed on a screen 702 of a user device such as for example UE 200. In some embodiments, the window 704 can have additional windows such as a sender window 706, a message window 708 having the structured summary of the message, and a structured prompt window 710 for the automated prompt.

In some embodiments, the sender window 706 can be located at the top of the window 704 and can be configured to display information such as a envelop information of the message e.g., sender, receipt time and date. In some embodiments, the message window 708 can include a structured summary of a message such as for example information about an order number, the expected date of delivery, contact phone number for problems or issues with the order, a delivery address, and information about the sender or vendor. In some embodiments, the original message can be similar to the message described above, however the structured summary of the message can be configured to provide information as a simple bullet point (e.g., minimum information) from the message such as a first line "Ceramic plates: order number 14235664" followed by a second line "Delivery date: 6/12-15" followed by a third line "Contact number: 747-876-9943." followed by a fourth line "Delivery address: 1601 West Haber St. Hamville, ND. 89765" each line of the structured summary line can be an abbreviated sentence and/or a portion of a sentence determined by the structured module 308 of the digest engine 300.

In some embodiments, the structured module 308 determines, utilizing an LLM, an intent of a user from the user input message in the structured prompt window 710, and displays the LLM generated prompt message in the structured prompt window 710 such as (e.g., Would you like a notification when your package arrives?). In some embodiments, the structured prompt window 710 can be configured to receive text input from a user for example, a user can input the text "send a text when it arrives" in structured prompt window 710. In some embodiments, the digest engine 300 can first determine vector representations utilizing the feature module 302 of the input text "send a text when it arrives" and then feed the vector representations of input text to the structured module 308 to determine a prompt message to display to a user. In response to the input text the LLM can for example initiate a notification to be sent to the user when the package arrives.

In some embodiments, each of the structured summary window 704, one line summary window 604 and a structured summary window 710 can be configured to include share functionality with different applications. For example, upon displaying a prompt message to a user in a structured prompt window 710 "would you like a notification when your package arrives" a share functionality of each of the LLMs can for example generate a text message to other recipients to notify other residents that live at the same address as the user that a package has arrived. In some embodiments, the digest engine 300 can be configured to detect for example an upcoming event in a calendar application such as "Bill's birthday on 7/14". In some embodiments, a sharing functionality of each of the LLMs, upon detection of a birthday or similar "event", can produce a prompt such as "would you like to wish Bill a happy birthday on social media?" In the case where a user responds "yes" the LLM prompt can be configured to access, a user's social media platform through an application programming interface (API) and post a text such as "Happy Birthday Bill". In some embodiments, the digest engine 300 can be configured to determine a user intent based on a user preference and initiate an action such as generating a text or message on behalf of the user or any combination thereof.

The subject matter disclosed above can, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter can be embodied as methods, devices, components, or systems. Accordingly, embodiments can, for example, take the form of hardware, software, firmware, or any combination thereof (other than software per se). The preceding detailed description is, therefore, not intended to be taken in a limiting sense.

Throughout the specification and claims, terms can have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology can be understood at least in part from usage in context. For example, terms, such as "and," "or," or "and/or," as used herein can include a variety of meanings that can depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate embodiments, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer readable medium (or computer-readable storage medium) stores computer data, which data can include computer program code or instructions that are executable by a computer, in machine readable form. By way of example, and not limitation, a computer readable medium can comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers or be loaded and executed by one or more servers. One or more modules can be grouped into an engine or an application.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all the features described herein are possible.

Functionality can also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

The invention claimed is:

1. A method comprising:
   identifying, by a device, an electronic message associated with an inbox of a user, the electronic message comprising a plurality of data items;
   analyzing, by the device, the electronic message, and information related to a digest preference of the user;
   generating, by the device, based on the analysis, a summary data structure corresponding to the electronic message, the summary data structure comprising at least a portion of the plurality of data items; and
   causing display, by the device, of an electronic digest in association with the inbox, the electronic digest comprising the summary data structure, the electronic digest further comprising interactive functionality enabling interaction with the summary data structure.

2. The method of claim 1, further comprising:
   generating a set of digest feature vectors, each digest feature vector corresponding to a respective data item from the plurality of data items, wherein the generation of the summary data structure is based on the set of digest feature vectors.

3. The method of claim 1, wherein the inbox of the user comprises a set of digest preferences, the set of digest preferences including:
   an unstructured summary preference corresponding to a manner in which the portion of data items are displayed within the digest, the manner being based on a structure of the portion of data items within the electronic message,
   a line summary preference, and
   a structured summary corresponding to a predefined manner for displaying the portion of data items within the digest.

4. The method of claim 1, further comprising:
   analyzing, by the device, via a large language model (LLM), the summary data structure; and
   generating, based on the LLM analysis, an automated prompt corresponding to a context of the portion of data items within the summary data structure.

5. The method of claim 4, wherein the displayed digest comprises functionality related to the automated prompt.

6. The method of claim 4, further comprising:
   receiving, in response to the automated prompt, input; and
   updating the display of the digest based on the input.

7. The method of claim 1, wherein the analysis of the electronic message is performed via the device executing one of an artificial intelligence algorithm and machine learning algorithm.

8. The method of claim 1 wherein the electronic message is a newly received message.

9. The method of claim 1 wherein, the electronic message is a message previously received within the inbox, the previously received message comprising time-sensitive content.

10. The method of claim 1, further comprising:
    analyzing information associated with another application, and determining information corresponding to the portion of the data items; and
    causing the determined information to be displayed as part of the digest.

11. The method of claim 10, wherein the other application corresponds to at least one of a notification application, an SMS application, a calendar application, a voicemail application.

12. The method of claim 1 wherein the digest is displayed as one of a tab within the inbox of a user, a message within the inbox of a user and a notification.

13. The method of claim 1, further comprising:
receiving, responsive to the displayed digest, input; and
displaying the electronic message within the digest.

14. A device comprising:
a processor configured to:
identify an electronic message associated with an inbox of a user, the electronic message comprising a plurality of data items;
analyze the electronic message, and determine, based on the analysis, information related to a digest preference of the user;
generate, based on the analysis, a summary data structure corresponding to the electronic message, the summary data structure comprising at least a portion of the plurality of data items; and
cause display, by the device, of an electronic digest in association with the inbox, the electronic digest comprising the summary data structure, the electronic digest further comprising interactive functionality enabling interaction with the summary data structure.

15. The device of claim 14, wherein the processor is further configured to:
generate a set of digest feature vectors, each digest feature vector corresponding to a respective data item from the plurality of data items, wherein the generation of the summary data structure is based on the set of digest feature vectors.

16. The device of claim 14, wherein the inbox of the user comprises a set of digest preferences, the set of digest preferences including:
an unstructured summary preference corresponding to a manner in which the portion of data items are displayed within the digest, the manner being based on a structure of the portion of data items within the electronic message,
a line summary preference, and
a structured summary corresponding a predefined manner for displaying the portion of data items within the digest.

17. The device of claim 14, wherein the processor is further configured to:
analyze, by the device, via a large language model (LLM), the summary data structure; and
generate, based on the LLM analysis, an automated prompt corresponding to a context of the portion of data items within the summary data structure, wherein the displayed digest comprises functionality related to the automated prompt.

18. The device of claim 17, wherein the processor is further configured to:
receive, in response to the automated prompt, input; and
update the display of the digest based on the input.

19. A non-transitory computer-readable medium tangibly encoded with computer-executable instructions, that when executed by a device, perform a method comprising:
identifying, by the device, an electronic message associated with an inbox of a user, the electronic message comprising a plurality of data items;
analyzing, by the device, the electronic message, and determining, based on the analysis, information related to a digest preference of the user;
generating, by the device, based on the analysis, a summary data structure corresponding to the electronic message, the summary data structure comprising at least a portion of the plurality of data items; and
causing display, by the device, of an electronic digest in association with the inbox, the electronic digest comprising the summary data structure, the electronic digest further comprising interactive functionality enabling interaction with the summary data structure.

20. The non-transitory computer-readable storage medium of claim 19, wherein the inbox of the user comprises a set of digest preferences, the set of digest preferences including:
an unstructured summary preference corresponding to a manner in which the portion of data items are displayed within the digest, the manner being based on a structure of the portion of data items within the electronic message, a line summary preference, and
a structured summary corresponding a predefined manner for displaying the portion of data items within the digest.

* * * * *